(12) United States Patent
Gu et al.

(10) Patent No.: US 10,141,018 B2
(45) Date of Patent: Nov. 27, 2018

(54) METHOD AND SYSTEM FOR OPTICAL DATA STORAGE

(71) Applicant: Shanghai Naguang Information Technology Corporation, Shanghai (CN)

(72) Inventors: Min Gu, Victoria (AU); Xiangping Li, Victoria (AU); Yaoyu Cao, Victoria (AU)

(73) Assignee: Shanghai Naguang Information Technology Corporation, Shanghai (CN)

( * ) Notice: Subject to any disclaimer, the term of this patent is extended or adjusted under 35 U.S.C. 154(b) by 0 days.

(21) Appl. No.: 15/039,368

(22) PCT Filed: Nov. 28, 2013

(86) PCT No.: PCT/AU2013/001378
§ 371 (c)(1),
(2) Date: May 25, 2016

(87) PCT Pub. No.: WO2015/077815
PCT Pub. Date: Jun. 4, 2015

(65) Prior Publication Data
US 2017/0025143 A1    Jan. 26, 2017

(51) Int. Cl.
*G11B 7/0065* (2006.01)
*G11B 7/1263* (2012.01)
(Continued)

(52) U.S. Cl.
CPC .......... *G11B 7/1263* (2013.01); *G11B 7/0045* (2013.01); *G11B 7/0065* (2013.01);
(Continued)

(58) Field of Classification Search
CPC .. G11B 7/26; G11B 7/243; G11B 7/24; G11B 27/3027; G11B 7/00745;
(Continued)

(56) References Cited

U.S. PATENT DOCUMENTS

| 5,625,613 A | 4/1997 | Kato |
| 6,115,345 A | 9/2000 | Kato |

(Continued)

FOREIGN PATENT DOCUMENTS

| EP | 20080305494 A | 2/2010 |
| GB | 2451992 A | 2/2009 |

(Continued)

OTHER PUBLICATIONS

International Search Report issued in PCT/AU2013/001378, dated Aug. 19, 2014.

(Continued)

*Primary Examiner* — Nabil Hindi
(74) *Attorney, Agent, or Firm* — RuyakCherian LLP; Song Zhu; Mark Lupkowski (57) ABSTRACT

Methods and apparatus for recording and retrieval of optically readable data employ a recording medium (100) which comprises an optically active material (108) able to induce a change in properties of the medium in the presence of optical radiation having a first characteristic, such as a first optical frequency, and wherein the change in properties can be inhibited by optical radiation having a second characteristic, such as a second optical frequency. During recording, a region of the recording medium (100) is irradiated with a first beam (506) of optical radiation having the first characteristic, the beam having a sufficient intensity within a central portion of the irradiated region and being of sufficient duration to cause an optically induced change in properties of the recording medium. Simultaneously, the region of the (Continued)

recording medium (100) is irradiated with a second beam (508) of optical radiation having the second characteristic, the second beam having a local intensity minimum within the central portion of the irradiated region, and a local intensity maximum in at least one portion of the irradiated region adjacent to the central portion which is sufficient to inhibit the optically induced change in properties of the recording medium. A similar method is employed for retrieval, however the intensity of the first beam (506) is reduced to prevent changes in material properties within the recording medium (100).

40 Claims, 5 Drawing Sheets (51) Int. Cl.
*G11B 7/0045* (2006.01)
*G11B 7/24044* (2013.01)
*G11B 7/128* (2012.01)
*G11B 7/13* (2012.01)

(52) U.S. Cl.
CPC ............... *G11B 7/128* (2013.01); *G11B 7/13* (2013.01); *G11B 7/24044* (2013.01); *G11B 2007/00457* (2013.01)

(58) Field of Classification Search
CPC ........ G11B 2007/0013; G11B 7/24038; G03C 5/60; G03F 7/001; G03H 1/02
USPC .............................. 369/275.1, 103, 275.3, 94
See application file for complete search history.

(56) References Cited

U.S. PATENT DOCUMENTS

| | | | |
|---|---|---|---|
| 8,580,464 B2* | 11/2013 | Natarajan | G11B 7/245 106/31.47 |
| 2005/0084800 A1 | 4/2005 | Tawa | |
| 2006/0087711 A1 | 4/2006 | Tukker et al. | |
| 2008/0260983 A1 | 10/2008 | Poupinet et al. | |
| 2009/0073850 A1 | 3/2009 | Ide et al. | |
| 2009/0103106 A1 | 4/2009 | Kimura et al. | |
| 2009/0109826 A1 | 4/2009 | Park et al. | |
| 2009/0122374 A1 | 5/2009 | Uno et al. | |
| 2012/0275001 A1 | 11/2012 | Ishibashi | |
| 2013/0128713 A1 | 5/2013 | Natarajan et al. | |

FOREIGN PATENT DOCUMENTS

| | | |
|---|---|---|
| JP | 2001-84625 A | 3/2001 |
| JP | 2009104717 A | 5/2009 |
| JP | 2009176388 A | 8/2009 |
| WO | 2004027769 A1 | 4/2004 |

OTHER PUBLICATIONS

Notification of Reasons for Refusal, Japanese Patent Application No. 2016-535163, dated May 9, 2017.
Search Report, Russian App No. 2016124784, dated Oct. 25, 2017.
Search Report, Chinese App No. 2013800818911, dated Jun. 5, 2018.
Search Report, EPO App No. 13898081.8, dated Jun. 29, 2017.

* cited by examiner

METHOD AND SYSTEM FOR OPTICAL DATA STORAGE

FIELD OF THE INVENTION

The present invention relates to data storage systems of the type based on the use of optical fields (e.g. laser light) to record and retrieve information using the physical properties of a suitable recording medium. The invention relates more particularly to very high density storage systems suitable for use in large data centres and the like.

BACKGROUND TO THE INVENTION

Optical storage media are media in which data is stored in an optically readable manner, so that they can be read, for example, by means of a laser and a photodetector being integrated in a pickup. Current generation commercial optical storage media include single- and dual-layer DVD and Blu-ray discs, in which recording and playback are based on controlling or detecting returned light from reflective layers within the medium (i.e. an optical disc). Of these, the highest data storage capacity is achieved by a dual-layer Blu-ray disc, which can contain up to about 50 gigabytes of information. However, emerging applications, for example in very large data centres, will require even higher density storage in future, in order to minimise the physical space required for data storage, as well as the energy requirements for maintaining and operating such data centres.

One technique for increasing storage density is to utilise all three dimensions of the storage medium, i.e. by storing additional data at different depths within the medium. Dual-layer DVD and Blu-ray discs are examples of this technique, and allow independent storage of data in two discrete recording layers, which are laminated within the disc structure, and accessed by adjustment of the laser beam focus. The number of discrete layers that can be incorporated into the recording medium in this manner is limited by physical characteristics, e.g. weight and thickness, and the data density in the depth dimension is also limited by the physical spacing of the layers.

A second technique for increasing storage density is to improve the optical resolution of the storage system. Conventionally, the resolution of optical data storage is limited by the diffractive nature of light. Higher density can be achieved either by increasing the numerical aperture of the optics, or reducing the wavelength (i.e. increasing the frequency) of the optical sources used for writing/reading. In any event, however, it is difficult to form a recording feature size smaller than a half wavelength of the writing beam, or conversely to detect a feature smaller than the half wavelength of the reading beam.

Recently, far-field super resolution recording methods have been developed which employ special polarisation states of the writing beam, or in which the pupil function at the back aperture of the objective is apodised. However, these methods cannot achieve a resolution below 50 nanometers. Additionally, bit sequential recording using these methods is intrinsically slow, and accordingly the data throughput is limited.

The most desirable characteristics for ultra-high density optical data storage are therefore high optical resolution, the ability to utilise all three dimensions of a bulk recording medium (i.e. without the need to laminate separate, discrete recording layers from differing materials), and high data throughput, both for recording and reproduction. There is an ongoing need for improved optical data storage methods and systems which are able to achieve superior performance across these key criteria.

SUMMARY OF THE INVENTION

In one aspect, the invention provides a method of recording optically readable data, the method employing a provided recording medium which comprises an optically active material able to induce a change in properties of the medium in the presence of optical radiation having a first characteristic, and wherein the change in properties can be inhibited by optical radiation having a second characteristic, the method comprising:

irradiating a region of the recording medium with a first beam of optical radiation having the first characteristic, the beam having a sufficient intensity within a central portion of the irradiated region and being of sufficient duration to cause an optically induced change in properties of the recording medium; and simultaneously irradiating the region of the recording medium with a second beam of optical radiation having the second characteristic, the second beam having a local intensity minimum within the central portion of the irradiated region, and a local intensity maximum in at least one portion of the irradiated region adjacent to the central portion which is sufficient to inhibit the optically induced change in properties of the recording medium.

Embodiments of the invention are advantageously able to achieve enhanced resolution, in excess of the usual diffraction limit, by suppressing a change in properties of the recording medium in a region defined by the second beam of optical radiation which surrounds the central spot of the first beam. The result is a change in properties in the recording medium, representing a stored information state, which is smaller, i.e. higher resolution, than would be achieved at the diffraction limit of the first beam alone.

In another aspect, the invention provides a method of optically reading data stored in a recording medium which comprises an optically active material in which a change in properties of the medium corresponding with recorded data has been induced in one or more regions, wherein the change in properties is detectable via a response of the medium to optical radiation having a first characteristic, and wherein the response of the medium can be inhibited by optical radiation having a second characteristic, the method comprising:

irradiating a region of the recording medium with a first beam of optical radiation having the first characteristic, the first beam having sufficient intensity within a central portion of the irradiated region and being of sufficient duration to cause the response, but of insufficient intensity and duration to cause an optically induced change in properties of the recording medium;

simultaneously irradiating the region of the recording medium with a second beam of optical radiation having the second characteristic, the second beam having a local intensity minimum within the central portion of the irradiated region, and a local intensity maximum in at least one portion of the irradiated region adjacent to the central portion which is sufficient to inhibit the response of the medium to the first beam of optical radiation; and detecting whether the medium exhibits the response to the first beam of optical radiation within the central portion of the irradiated region.

As with the recording aspect of the invention, embodiments of the reading aspect are able to achieve higher resolution through the mechanism of inhibition of the material response in a region immediately surrounding the central spot of the first beam of optical radiation.

In some embodiments, the first and second characteristics comprise different optical frequencies. In other embodiments the first and second characteristics comprise different polarisation states. In still further embodiments, the first and second characteristics comprise different optical pulse widths.

In embodiments of the invention the first beam of optical radiation has a Gaussian-shaped intensity distribution. As will be understood by persons skilled in the optical arts, a Gaussian-shaped beam has a diffraction limited spatial resolution. Accordingly, for example, if the first beam is derived from an optical source having a wavelength of 800 nanometers, a maximum resolution of around 400 nanometers would be expected.

In some embodiments, the second beam has an annular intensity distribution. An annular intensity distribution may be obtained, for example, by focusing a circularly polarised beam with a Laguerre-Gaussian mode or an azimuthally polarised beam for producing a 'doughnut' shape.

Advantageously, by spatial superposition of the first and second beams, and appropriate control of their relative intensity, it is anticipated that the resolution of optical storage may be improved to below 50 nanometers.

In some embodiments, the second beam is formed to provide a three-dimensional hollow intensity distribution. This may be achieved, for example, by the combination of a circularly polarised beam with a Laguerre-Gaussian mode (or vortex phase with a topological charge) and a circularly polarised beam with a concentric $\pi$ phase shift in the centre of the beam to form the hollow shape. A hollow cage shape can be produced by focusing a cylindrically polarised beam with a concentric $\pi$ phase shift in the centre of the beam.

Advantageously, the three-dimensional hollow intensity distributions of the second beam may be employed to inhibit changes in properties during writing, or to inhibit a response during reading, in a three-dimensional space surrounding a central focal point of the first beam. This enables the recording of information states in all three dimensions of the bulk recording material, at a comparable resolution along all dimensions, without the need to form a physically layered recording structure.

The first and second beams may be generated from either pulsed or continuous wave (CW) optical sources.

In some embodiments, the first and second beams comprise a plurality of parallel beams. For example, a pupil function of the beams may be engineered to create multi-focal arrays in the focal plane. Superposition of a multi-focal array having Gaussian-shaped focal spots corresponding with the first beam, and multi-focal arrays with hollow or annular focal spots, corresponding with the second beam, advantageously enables parallel recording/reproduction with an increased data transfer rate.

In some embodiments, the polarisation states of the first and second beams are arranged and superposed to create any desired three-dimensional polarisation orientation. Advantageously, this enables multiple information states to be encoded in the polarisation states of the writing beam, at the same spatial position within the recording medium.

In embodiments of the reading aspect of the invention, the material response indicating changed properties is broadband optical radiation/phosphorescence. Accordingly, a recorded information state may be read by detecting, e.g. using a photodetector, whether the medium emits radiation in response to application of the first and second beams.

In another aspect, the invention provides an optical data recording and reproduction apparatus comprising:

a mounting configured to hold a recording medium which comprises an optically active material able to induce a change in properties of the medium, and to generate a material response indicative of the changed properties, in the presence of optical radiation having a first characteristic, and wherein the change in properties, and the response indicative of changed properties, can be inhibited by optical radiation having a second characteristic;

a first optical source configured to control the emit radiation having the first characteristic;

a first imaging system configured to controllably focus a first beam of optical radiation emitted from the first optical source onto a region of the recording medium, wherein the optical radiation has a maximum intensity within a central portion of the first beam;

a second optical source configured to controllably emit radiation having the second characteristic;

a second imaging system configured to controllably focus a second beam of optical radiation emitted from the second optical source onto the region of the recording medium, wherein the optical radiation has a local intensity minimum within a central portion of the second beam, and a local intensity maximum in at least one portion of the second beam adjacent to its central portion; and a controller configured to control at least the first optical source, the first imaging system, the second optical source, and the second imaging system, so as to simultaneously irradiate a selected region of a recording medium held in the mounting with optical radiation of a first selected intensity emitted from the first optical source, and with optical radiation of a second selected intensity emitted from the second optical source, to selectively record or read data to or from the recording medium.

In some embodiments, at least the first imaging system comprises a modulator controllable to selectively block the first beam from irradiating the recording medium. Advantageously, the modulator may be controlled to determine whether or not a change in information state is recorded in the medium, and/or whether any information state stored in the medium is readout.

In embodiments of the invention, the controller is configured to control intensity of at least the first optical beam in order to select between write and read operation of the recording and reproduction apparatus. For example, a relatively high intensity may be used for a write operation, while a lower intensity may be employed for a read operation.

In some embodiments, the recording medium comprises a disc, and the mounting comprises a spindle configured for secure mounting of the disc, which is actuated by a motor having a controllable speed to enable an angular velocity of the disc to be controlled. The first and second imaging systems may further be configured to enable the selected region of the recording medium to be radially translated, for example by optical and/or mechanical positioning of focal spots. In some embodiments, the disc recording medium comprises radially disposed detectable tracking elements, such as reflective, metallic or magnetic elements, to provide a closed loop feedback mechanism during translation, or tracking, of the imaging systems. In particular, in some embodiments the apparatus comprises at least one tracking element sensor which is coupled to a server controller configured to maintain the radial position of the imaging systems relative to the disc.

In some embodiments, the first and second imaging systems are configured to generate a plurality of parallel optical beams. Also in some embodiments, the first and second imaging systems each comprise a spatial modulator positioned to enable selective formation the plurality of parallel optical beams.

In some embodiments, the mounting and/or imaging systems are configured to enable the selected region of the recording medium to be located at a controllable depth within the recording medium. For example, focal spots of the first and second beams may be controllably located at an arbitrary position within the recording medium, by means of one or both of optical and mechanical positioning.

In some embodiments, the material response indicating changed properties is broadband optical radiation/phosphorescence, and the apparatus further comprises a photodetector configured to detect the presence of emitted radiation/phosphorescence during and/or following irradiation of the recording medium by the first and second beams.

In another aspect, the invention provides an optical data storage system comprising:

a plurality of optical data recording and reproduction apparatuses embodying the invention;

a plurality of recording media associated with each optical data recording and reproduction apparatus, each recording medium being selectably loadable to the mounting of the associated optical data recording and reproduction apparatus; and a storage controller configured to receive requests for recording and retrieval of data within the storage system, to identify recording media within the system required for completion of the received requests, to cause the required recording media to be loaded to each associated optical data recording and reproduction apparatus, and to cause the associated optical data recording and reproduction apparatuses to complete recording and/or retrieval operations required for completion of the received requests.

In another aspect, the invention provides a recording medium comprising a plurality of layers wherein at least one layer comprises an outer protective layer, and at least one other layer comprises an optically active material able to induce a change in properties of the medium, and to generate a material response indicative of the changed properties, in the presence of optical radiation having a first characteristic, and wherein the change in properties, and the response indicative of changed properties can be inhibited by optical radiation having a second characteristic.

In some embodiments, the recording medium comprises a disc.

Further, the recording medium may comprise at least two protective layers, disposed on opposing faces of the optically active material.

According to an embodiment the optically active material comprises a first excited state to which a transition may be induced by optical radiation having the first characteristic, and wherein the change in properties of the recording medium results from absorption of optical radiation having the first characteristic when in the first excited state. Accordingly, in such embodiments the optically active material desirably possesses a large nonlinear absorption coefficient.

Furthermore, in embodiments of the invention the presence of optical radiation having the second characteristic induces a rapid transition from the first excited state, thereby inhibiting the change in properties of the medium.

Embodiments of the invention may employ an optically active material which comprises an organic conjugated molecule having abundant delocalised electrons, in conjugated systems containing: vinyl groups; phenyl groups; or carbonyl groups. For induced photo-physical/chemical reactions via absorption from the first excited state, embodiments of the invention employ an optically active material comprising groups such as: amide groups; carbonyl groups; ester groups; or amine groups.

In embodiments of the invention, the material response indicating changed properties is broadband optical radiation/phosphorescence, which is achieved by decay of the first excited state to a ground state, in which case the material advantageously exhibits a photoluminescence process having a reasonably large quantum yield, for example a quantum yield larger than 10 percent. Suitable materials in embodiments of the invention include those having large conjugated pi orbitals for the working molecule in the recording medium, to enhance the function of the second beam to inhibit action of the first beam, and to increase a photon-induced transition rate from a second excited state to a ground state. Molecule candidates for embodiments of the invention include: coumarin and its derivatives; thioxanthone and its derivatives; methanone and its derivatives; cyclopentanome and its derivatives; or rhodamine and its derivatives.

In some embodiments, the thickness of the optically active material layer is sufficient to allow multiple internal layers of information storage.

In some embodiments, the recording medium comprises a tracking layer having radially disposed detectable tracking elements. Suitable tracking elements include one or more of: magnetic tracking elements; optical tracking elements; metallic tracking elements; and physical tracking elements (such as pits or grooves).

Further features, benefits and applications of the invention will be apparent from the following description of exemplary embodiments, which are provided to give the skilled person a fuller understanding of the nature and operation of embodiments of the invention, but which should not be considered to limit the scope of the invention as described in any of the foregoing statements, or defined in the claims appended hereto.

BRIEF DESCRIPTION OF THE DRAWINGS

Embodiments of the invention will now be described with reference to the accompanying drawings, in which like reference numerals refer to like features, and wherein.

DETAILED DESCRIPTION OF EMBODIMENTS

Figure 1:
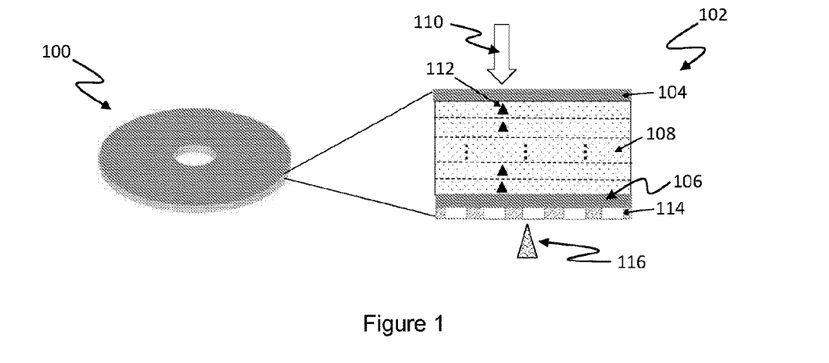
FIG. 1 illustrates a disc-shaped recording medium embodying the invention.

As shown in FIG. 1 a disc-shaped recording medium 100 embodying the invention comprises a number of layers, as shown in cross-section 102. The disc 100 has a central hole, in a conventional manner, for receiving a spindle for spinning the disc. An upper protective layer 104 comprises an anti-wear substrate with refractive index matched to one or more recording layers 108, which comprise an optically active material able to induce a change in properties of the medium, and to generate a material response indicative of the changed properties, in the presence of optical radiation having a first characteristic, and wherein the change in properties, and the response indicative of changed properties, can be inhibited by optical radiation having a second characteristic.

In particular embodiments described herein, the first and second characteristics are optical frequency (i.e. photon energy), as described in greater details below with reference to FIGS. 2 and 3.

A lower protective layer 106 is also provided.

In the configuration shown, combined first and second laser beams 110 irradiate the disc 100 from above. The upper protective layer 104 is transparent to these dual beams. In operation, the beams are focused on a region within the recording layers 108, as described in greater detail below, in particular with reference to FIG. 4. By appropriate control of the form and intensity of the first and second beams, changes in properties may be induced within the recording layers 108, so as to encode stored information. The stored information can also be read by detecting the regions having changed properties, again by appropriate control of the parameters of the dual beams 110.

The recording layers 108 may comprise markings 112 disposed at radial intervals within the disc 100. The markings can have optically detectable properties to enable reading and writing apparatus to track the position of the laser beams 110 along the radial direction. In addition, the exemplary disc 100 comprises a magnetic tracking layer 114, which consists of accurately positioned concentric rings of magnetic material, which can be detected by a magnetic probe 116, whereby a servo system can be employed to correct for drift and/or movement of discs during operation.

Figure 2:
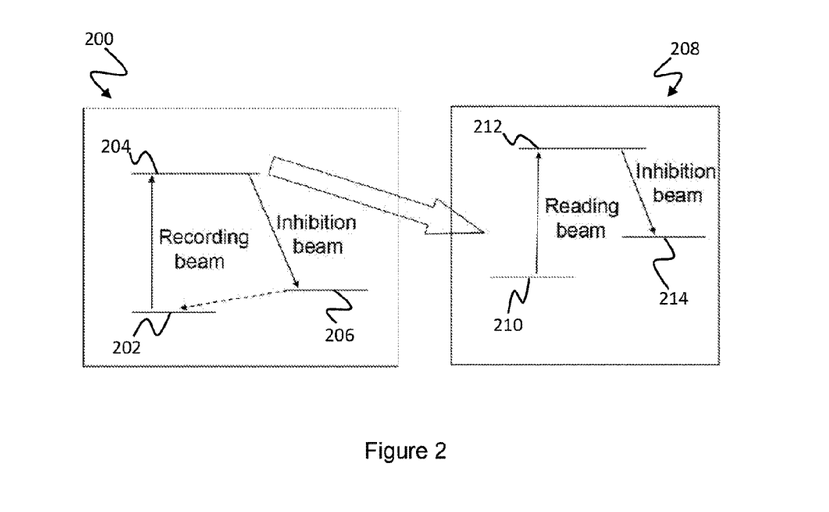
FIG. 2 shows energy level diagrams for an optically active material illustrating record and read operations according to an embodiment of the invention.

FIG. 2 shows energy level diagrams for an optically active material suitable for use in the recording layers 108 of media embodying the present invention. The materials are can possess particular physical and/or chemical characteristics such that a change in properties can be induced by optical radiation having a first characteristic, and wherein the change in properties can be inhibited by optical radiation having a second characteristic. The energy level diagrams shown in FIG. 2 are representative of an exemplary material in which the first characteristic is a first optical frequency (or photon energy), and the second characteristic is a different optical frequency (or photon energy).

A sample of the material is represented initially by the energy level diagram 200. Molecules in the material have a first ground state 202, and a first excited state 204, with a transition from the ground state 202 to the excited state 204 being induced in the presence of an optical field of sufficient intensity, and having an optical frequency corresponding with the energy difference between the excited state 204 and ground state 202.

The molecules in the material have a second ground state 206, having a corresponding second energy difference relative to the excited state 204. In the presence of a second optical field of sufficient intensity, and having a frequency corresponding with the energy difference between the excited state 204 and the ground state 206, a rapid transition from the excited state 204 to the ground state 206 will be induced, which will subsequently decay to the first ground state 202.

Accordingly, in the presence of the second optical field, also known as an 'inhibition field', no change in the properties of the material occurs. However, in the presence of the first optical field of sufficient intensity, also referred to as the 'recording field', and in the absence of the inhibition field, molecules may remain for a longer period in the excited state 204. Within this state, further absorption of photons from the recording field may result in a photo-physical/chemical change in the material, resulting in a change in its characteristic energy levels. Exemplary energy levels of the changed material are shown in the diagram 208.

The optically modified material has a new first ground state 210, and a new corresponding excited state 212, having an energy difference corresponding with the first optical field frequency. A new second ground state 214 exists at an energy level which is below the new excited state 212 by an amount corresponding with the inhibition field frequency. Accordingly, in the presence of the inhibition field, the excited state 212 is short-lived. However, in the absence of the inhibition field the excited state is longer-lived, and may exhibit photo-luminescence when decaying back to the ground state 210, the ground state 214, or another lower energy level. The resulting photo-luminescence may be detected, in order to identify the presence of the modified material.

As will be appreciated, therefore, a first optical field, having a first optical frequency, may be used to induce changes in the material, which can subsequently be identified, again by exposing the material to the first optical field. In the presence of the inhibition field, however, this change in properties may be supressed. By controlling the intensity ratio between the two fields, conversion between the two material states may be controlled, and thereby used to encode information within the recording layers 108.

For the above mechanisms to be effective, the optically active material can have the following properties. Firstly, it can contain molecules with large absorption coefficient. For example, a large nonlinear absorption coefficient is desirable for recording in all three dimensions, to enable the transition from the ground state 202 to the excited state 204. Examples of suitable materials include the organic conjugated molecules with abundant delocalised electrons in conjugated systems containing vinyl groups, phenyl groups or carbonyl groups.

Secondly, the material can induce photo-physical/chemical reactions from the excited state 204. For example, the organic molecules may include some active groups such as amide groups, carbonyl groups, ester groups or amine groups.

Thirdly, the excited state 204 can decay to either the ground state 202 or the ground state 206 accompanied by a photo-luminescence process such as fluorescence, which may have a sufficient quantum for this purpose, for example larger than 10 percent. In this regard, large conjugated pi orbitals for the working molecules in the recording medium may be required to enhance the function of the inhibition field, and to increase the photon-induced transition rate from the excited state 212 to the ground state 202. To satisfy these criteria, the molecule candidates include coumarin and its derivatives, thioxanthone and its derivatives, methanone and its derivatives, cyclopentanome and its derivatives, or rhodamine and its derivatives.

Figure 3:
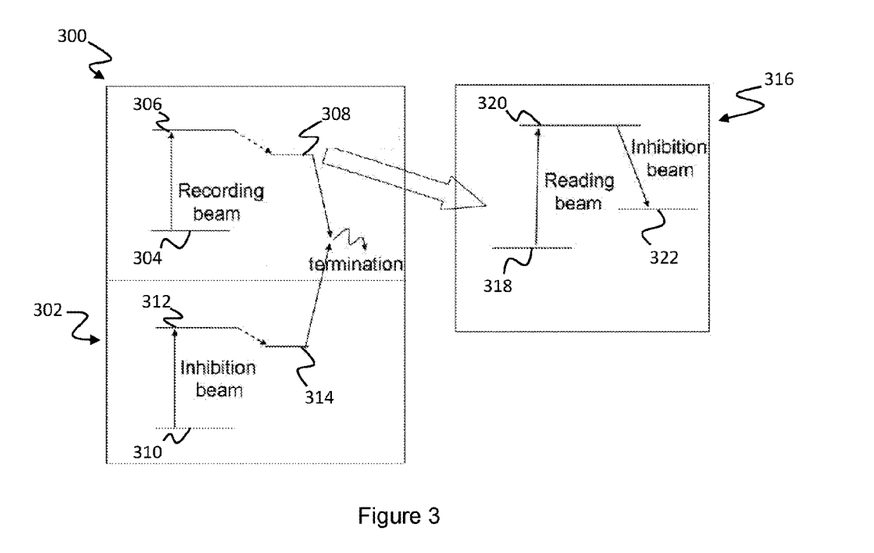
FIG. 3 shows energy level diagrams for an alternative optically active material illustrating record and read operations according to an embodiment of the invention.

FIG. 3 shows energy level diagrams for an alternative optically active material embodying the invention. The material comprises two types of molecules, represented by the energy diagrams 300, 302, one of which is an initiator, and the other of which is an inhibitor. In the presence of a recording field the initiator molecules may transition from a ground state 304 to an excited state 306, and then decay to a triplet state 308. Additionally, in the presence of an inhibition field the inhibitor molecules may transition from a ground state 310 to an excited state 312, and decay to a triplet state 314.

In the absence of inhibitor molecules in the triplet state 314, for initiator molecules in the triplet state 308 further absorption of photons may result in photo-physical/chemical change in the material, resulting in modified energy levels comprising a ground state 318, an excited state 320, and a second ground state 322, as shown in the energy level diagram 316. It will be noted that detection of the modified material having energy levels 316 can be performed in the same manner as for modified material having energy levels 208 shown in FIG. 2.

When the inhibitor molecules are excited into the triplet state 314, they can form chemically reactive species, such as radicals, which will prevent the transition in properties of the material. For example, the excited initiator can cause a polymerization or depolymerization through active radical generation processes to conduct the transfer. For adequate inhibition efficiency, the inhibitor can have a triplet state for a high quantum yield of reactive species. Further, the reactive species may only react with the initiator at the energy level of the triplet state 314 and its product be generated from the energy level of the triplet state 314.

In order to satisfy all of the above criteria, the initiator may be, for example, methanone and its derivatives or cyclopentanome and its derivatives, while the inhibitor can be a disulphide and its derivatives.

Figure 4:
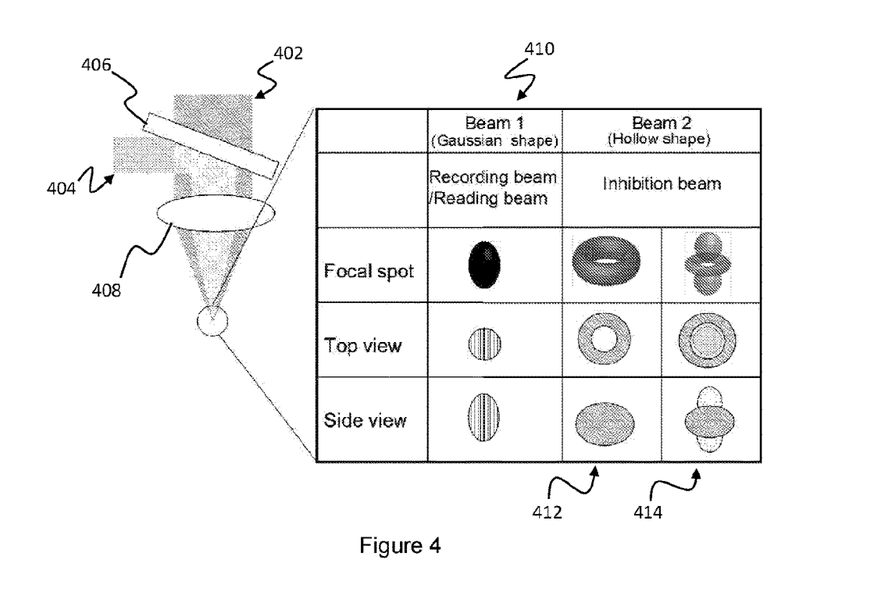
FIG. 4 is a diagram illustrating schematically beam and focal spot forms of first and second optical beams embodying the invention.

FIG. 4 is a diagram illustrating schematically beam and focal spot forms of first (i.e. recording or reading) and second (i.e. inhibition) optical beams embodying the invention. The first beam 402 is combined with the second beam 404 using a beam splitter 406, and the combined beams are focused via an imaging system 408. The two beams are therefore simultaneously focused on a selected region within the recording layers 108 of the recording medium, such as the disc 100.

As illustrated in the first column 410 of the table in FIG. 4, the first beam has an intensity maximum within a central portion, and in the example shown produces a focal spot in the form of a generally oblate spheroid.

As shown in column 412 of the table in FIG. 4, the second beam may be formed so as to have a local intensity minimum within a central region, and a generally annular intensity profile surrounding this region. Alternatively, as shown in column 414, the second beam may be formed so as to produce a generally hollow intensity distribution in three dimensions around the focal region. In general, the desired characteristic of the second beam is to have a local intensity minimum within the central portion of the irradiated region, and a local intensity maximum in at least one portion of the irradiated region adjacent to the central portion.

Accordingly, application of the first beam to a selected region of the recording medium can result in recording or readout of material properties in the vicinity of the focal spot. The presence of the inhibition field, for example in the form of an annulus or three-dimensional hollow region, restricts the volume over which the recording or readout occurs, by causing inhibition of the relevant processes within the surrounding region, as illustrated above with reference to FIGS. 2 and 3. Overall, therefore, the dual-beam operation according to embodiments of the invention can result in enhanced resolution of recording and readout, and therefore in significantly increased data storage density.

The form of the first beam 402 may be a conventional Gaussian profile, having a diffraction-limited spatial resolution. The annular form of the second beam 404 may be obtained by focusing a circularly polarised beam with a Laguerre-Gaussian mode, or an azimuthally polarised beam, in order to produce a 'doughnut' shape. The hollow-centred form (e.g. as shown in column 414) may be formed by the combination of a circularly polarised beam with a Laguerre-Gaussian mode (or vortex phase with a topological charge) and a circularly polarised beam with a concentric pi phase shift in the centre of the beam. A hollow-cage shape can be produced by focusing a cylindrically polarised beam with a concentric pi phase shift in the centre of the beam.

Figure 5:
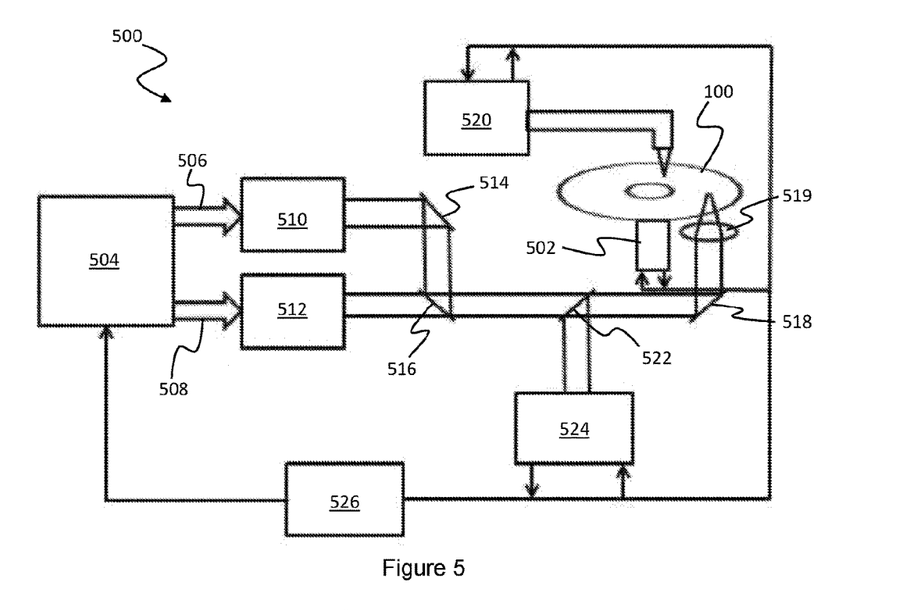
FIG. 5 is a block diagram of an optical data recording and reading apparatus embodying the invention.

FIG. 5 is a block diagram of an optical data recording and reading apparatus embodying the invention. Such an apparatus is commonly known as an optical drive, or simply a drive.

The optical drive 500 comprises a mounting 502 configured to hold the recording medium, i.e. optical disk 100. The mounting 502 comprises a spindle configured for secure mounting of the disc via the central hole, which is actuated by a motor having a controllable speed to enable an angular velocity of the disc to be controlled.

A laser source 504 includes first and second optical sources 506, 508 which are passed through first and second imaging systems 510, 512. The imaging systems 510, 512 are arranged in the manner described above, with reference to FIG. 4, in order to generate the desired first and second beam shapes, for recording/reading and inhibition respectively. A mirror 514 and beam splitter 516 are used to combine the first and second beams. The combined beams are then focused onto the selected region of the recording medium 100 via a tracking mechanism, or optical head, represented in the simple block diagram of FIG. 5 by the mirror 518 and lens 519. The tracking system is controllable at least to move radially relative to the disc 100, to enable selection of a particular track for recording/reading.

A servo system 520 is connected to the probe 116 and comprises a feedback loop which can be used to maintain the desired speed of rotation and tracking with sufficient precision to record to, and read from, desired regions of the disc 100.

During read operations, light emitted from the disc 100 in response to the applied optical fields is returned via the tracking optics 519, 518, and reflected from the beam splitter 522 to a detection system 524. The detection system 524 may comprise a photosensitive detector and demodulator to demodulate the read information. Fluorescence pass filters are used before the photosensitive detector to reject noise and residual laser beams.

The components of the drive 500, i.e. the laser source 504, the servo system 520, the tracking system 518, 519, and the detection system 524 are operated under the control of an electronic controller 526, which typically comprises a microprocessor, suitable programming, and other electronic components for sending and receiving control signals between the components of the drive 500.

Further properties and parameters of recording and playback may be based on existing optical storage technologies, such as DVD and Blu-ray disc technologies. For example, a modulation technique (8-to-16 modulation) may be applied for encoding data recorded onto the disc 100. To confirm constant throughput and constant data density across the entire disc media, constant linear velocity (CLV) operation may be employed, for example at a speed of 60 m/sec, for recording and reading. Subject to minimum read and write cycle times, throughput may be improved by increasing the CLV. Throughput for bit recording is T=CLV/d, where CLV is the constant linear velocity used in the system and d is the length (i.e. on/in the physical disc 100) of a single bit.

Figure 7:
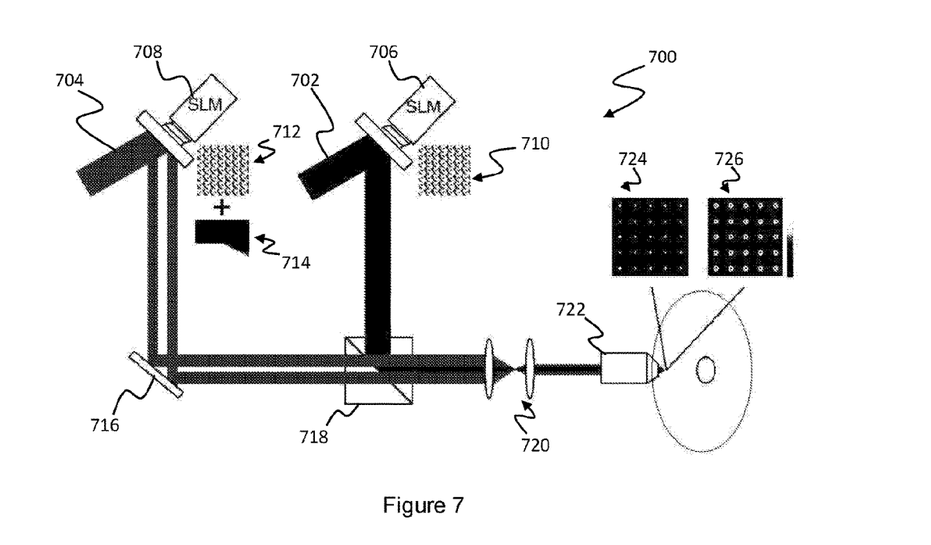
FIG. 7 is a diagram illustrating an arrangement for parallel recording and reading according to an embodiment of the invention.

The drive may be capable of parallel recording and reading, as described in greater detail below with reference to FIG. 7. Recording and reading throughput may be increased accordingly. After applying parallel writing, overall data recording throughput is $T_{drive}=p \times T$, where p is the number of parallel recorded bits.

As shown in FIGS. 1 and 5, a magnetic servo system, employing a magnetic tracking layer 114 and probe 116, is used for an ultra-high precision correction to the walk-off of the spinning disc during recording and reading. The servo system may comprise a reading head, a micro-actuator, and a digital controlling circuit. The main task of the servo system is to detect a position error signal and correct position errors. The probe 116 is operated by the micro-actuator, and is located near the disc surface with magnetic track-grooves (in tracking layer 114, as shown in FIG. 1). The position of the head is determined by reading position signals pre-encoded in the track-grooves, which generates position error signals for correcting the position of the optical head 518, 519. The digital controlling circuit is used to control the micro-actuator, transfer the position signals and coordinate the sampling rate of the servo system with the optical recording and reading system. Based on the position signals from the servo system, actuators used to drive the optical head may be capable of adjusting the relative position of laser beams with ultra-high precision, e.g. under 30 nm.

In an alternative embodiment (not shown) an optical servo system may be employed. The optical servo system comprises a quarter-photodetector, astigmatism optics and a differential circuit. A servo laser, operating, for example, at a wavelength of 658 nm, is constantly focused on a groove structure formed in the disc 100. The reflected servo laser beam then carries the walk-off information of the disc after passing through the astigmatism optics composed of a pair of circular and cylindrical lenses. The quarter-photodetector can sense the shape change of the reflected beam. The quarter-photodetector generates four signals (A, B, C and D). The differential circuit can use these four signals to judge the status of the walk-off, spindle speed, tracking error and focusing error signals. An RF signal is generated by adding the four signals (A+B+C+D). From the frequency of the RF signal, the speed of the spindle can be determined. Radial focus error can be measured by (A+C−B−D)/(A+B+C+D), which is called the focus error signal. Lateral focus error (tracking error signal) can be measured by (A+B−C−D)/(A+B+C+D). Corresponding currents will be applied to the actuators controlling the optical head to adjust the relative position of the objective lens 519 of the head with respect to the axial and lateral track position of the disc.

Figure 6:
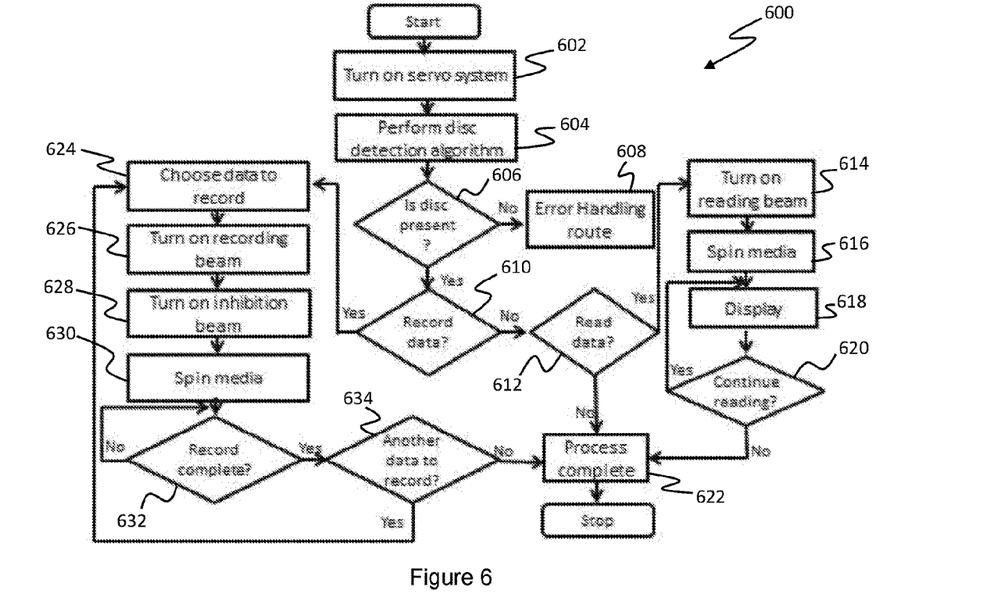
FIG. 6 is a flowchart of an exemplary recording/reading control algorithm implemented by the controller of FIG. 5.

FIG. 6 shows a simplified flowchart 600 of an exemplary recording/reading control algorithm which may be implemented within the controller 526. The first steps, in the case of either writing or reading, are to activate 602 the servo-system and perform 604 a detection algorithm, which confirms the presence of a disc with appropriate tracking marks. If no disc is present 606, then an error is reported 608.

At the decision point 610, the algorithm proceeds along alternative paths depending upon whether a read-data operation or a record-data operation is requested. In the case of read-data 612, the controller activates the reading beam at step 614. The controller ensures that the intensity level of the reading beam is sufficient to generate a photo-luminescence response, but below the intensity level at which the material properties will be changed (i.e. in the case of recording). The controller 526 also activates the spindle motor at step 616. Typically, during a read operation some form of indication or other display will be generated 618, to provide a visual confirmation for any observer that readout is taking place. The controller continues the read operation 620 until all desired information has been retrieved from the disc 100, at which time the process is complete 622.

In greater detail, prior to reading the controller may perform address searching to find a targeted sector. For searching disc location, the controller 526 turns on the servo system 520 to find the track position first. Then the power of the first beam 506 is reduced one tenth of that employed during recording to avoid destructive reading. Axial scanning is performed by detecting the collected fluorescence to find the targeted information layer. Once the disc location is confirmed, the controller 526 switches to dual-beam mode and synchronizes the laser gating with the disc rotation. The photosensitive detector in the detection system 524 converts the detected optical data signal into corresponding digital electrical signal. The electrical signal is demodulated by the decoder and finally transferred to a host device as retrieved data.

In the case of data recording, the controller first receives the data to be recorded at step 624. At step 626 the recording beam is activated, at a sufficient intensity to initiate changes in properties of the recording medium. The inhibition beam is also activated 628. As in the case of reading, the controller activates the spindle motor at step 630. Recording then proceeds 632 until the input block of data has been fully recorded. At step 634 the controller determines whether a further block of data is to be recorded, and if so control returns to step 624. Otherwise, the recording process is complete 622.

Parallel recording is also possible in embodiments of the invention, in order to significantly increase recording and readout throughput. An arrangement 700 suitable for implementation within the drive 500, for parallel recording and reading is shown in FIG. 7. In general, the arrangement 700 employs spatial light modulators (SLMs) within the beam path of each of the first and second (i.e. recording/reading and inhibition) beams. Computer-generated phase patterns displayed on the SLMs are used to generate multi-focal arrays in the recording medium.

In particular, first and second beams 702, 704 are directed onto first and second SLMs 706, 708. The SLMs display suitably generated phase patterns 710, 712, as described in greater detail below. The SLM 708 may also be used to add a vortex-phase wavefront 714, or this can be included via a separate phase plate. The beams 702, 704 may be either continuous wave (CW) or pulsed, however in the case of generating a large number of focal spots, a pulsed mode with high peak intensity may provide advantages over a CW mode operation.

Mirror 716 and beam splitter 718 are used to combine the first and second beams, and the combined beam is passed through collimating optics 720. An objective 722 is used to focus the optical field onto the recording medium 100. The result is an array of focal spots of the first and second beams, such as are illustrated schematically 724, 726 in FIG. 7. In this way, a corresponding array of data values may be simultaneously written or read. Individual spots, to control writing of specific information states, may be turned on and off by appropriate computer control of the SLMs.

For the computer-generation of multifocal array phase patterns used to control the SLMs, superposition of an in-plane comb function of electric fields in the focal plane and an intensity weighted iterative method may be applied to maintain high uniformity in a multifocal array. The vectorial Debye diffraction theory in which the apodisation and depolarization effects are fully considered can be used in the calculation process. Specifically, an iterative algorithm between a hologram plane and a focal plane may be carried out to obtain a diffraction limited multifocal array with high uniformity. The approach starts with an input electric field of a uniform plane wavefront and an arbitrary initial phase guess in the hologram plane. The Debye integral transforming of this wavefront is carried out to estimate the output electric field in the focal plane. The corresponding peak intensity the pre-determined locations in the output plane is compared with the ideal peak intensity, which is an equally weighted in-plane comb. The peak intensity error ε of the two is calculated, and the amplitude of the complex electric field in the focal plane is further replaced by the ideal comb function. In order to improve the uniformity in a multifocal array, a weighting factor is introduced:

$$w_m^k = w_m^{k-1} \frac{<|I_m^{k-1}|>_m}{|I_m^{k-1}|}$$

where k is the iteration number, m represents the mth focal spot in an array and I denotes the peak intensity. After effective weighting for each focal spot, inverse transforming the new adapted electric field yields the corresponding field in the input plane. The amplitude in the input plane no longer matches the uniform plane wavefront case, so it is further replaced by the uniform amplitude. And the phase in the input plane is kept for the next iteration. This completes one iteration and the cycle repeats until the intensity error ε in the nth iteration converges to within an acceptable tolerance range, for example 0.01. The consecutively adapted phase in the input plane is the final multifocal array phase pattern.

This algorithm is independent of the form of the incident wavefront, however it depends on wavelength of laser light, and therefore two SLMs 706, 708 for the dual beams can be used when optical sources of two different frequencies are employed for recording.

Although x-linear polarization is applied in the above algorithm, the calculated phase can also be applied to any type of polarization state which can be converted after the SLM phase modulation. Therefore, the polarization state in a multifocal array is identical and it depends on the polarization state in the back aperture plane of the objective lens.

Figure 8:
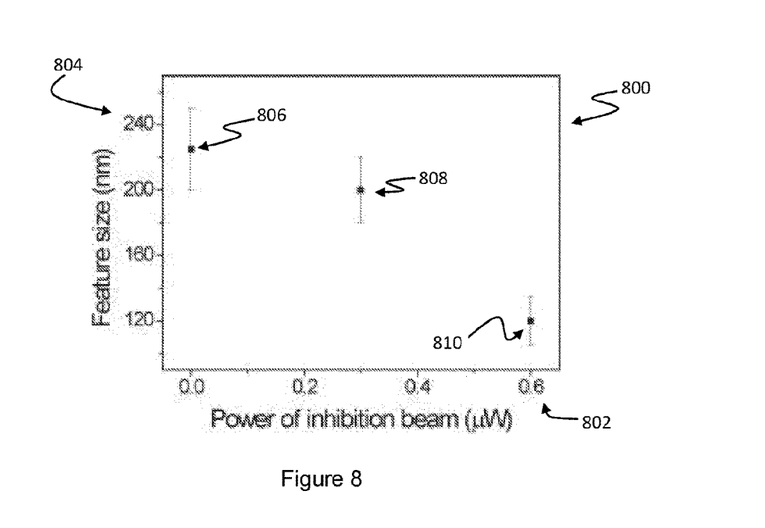
FIG. 8 is a graph illustrating a relationship between inhibition beam power and feature size embodying the invention.
Figure 9A:
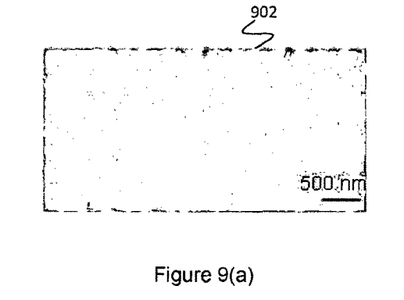
FIG. 9 shows scanning electron microscope (SEM) images comparing single-beam recording with dual-beam recording according to an embodiment of the invention.
Figure 9B:
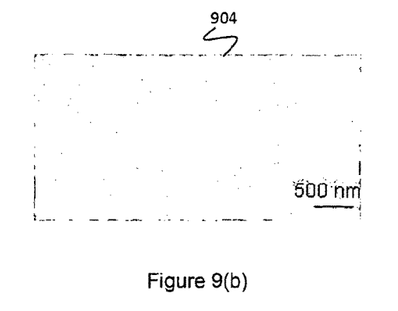

Proof of concept experiments have been conducted to demonstrate the effectiveness of the high-resolution dual-beam recording methods and apparatus embodying the invention. FIGS. 8 and 9 show illustrative results from these experiments. A first (recording) beam was generated using a pulsed laser source having a repetition rate of 80 megahertz, and a pulse width of 140 femtoseconds at a wavelength of 800 nanometers. The second (inhibition) beam was generated from a CW source at a wavelength of 375 nanometers.

FIG. 8 is a graph 800 illustrating a relationship between the resulting feature size generated during recording, and the power of the second (inhibition) beam. The inhibition beam power is shown on the horizontal axis 802, while the corresponding feature size is shown on the vertical axis 804. In the absence of the inhibition beam, as shown by the data point 806, a feature size of around 220 nanometers was obtained. With a 0.3 microwatt inhibition beam power, as shown by the point 808, the features size reduced to just under 200 nanometers. When the power of the inhibition beam was further increased to 0.6 microwatts, as shown by the point 810, the feature size reduced to below 120 nanometers. This clearly illustrates the ability of the dual dual-beam recording method to produce feature sizes below the diffraction limit of the recording beam.

FIG. 9 shows scanning electron microscope (SEM) images comparing single-beam recording 902 and dual-beam recording 904, with an inhibition beam power of 0.3 microwatts. As shown in the first image 902, due to the diffraction limit of the recording optics, the bit array produced by a single recording beam with a centre to centre distance of 300 nanometers does not enable each individual spot to be clearly discerned. However, when the inhibition beam, with a power of 0.3 microwatts, was also active it is possible to clearly distinguish individual spots within an array having a centre to centre distance of 200 nanometers, clearly illustrating the capacity of embodiments of the invention to provide an increased data storage density.

Figure 10:
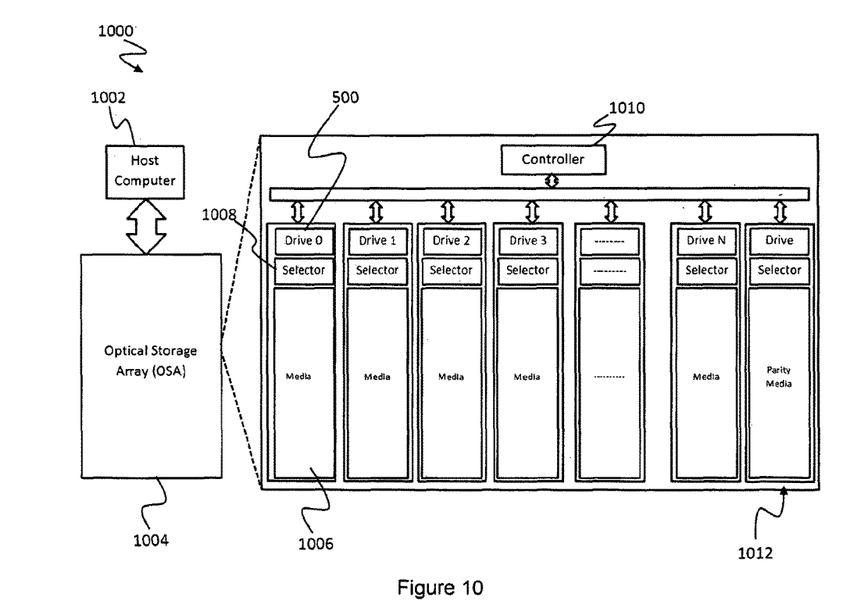
FIG. 10 is a block diagram illustrating an optical storage array system comprising optical drives embodying the invention.

Due to the potential for extremely high-capacity and high-density data storage, it is anticipated that embodiments of the invention will find application in large data centres. FIG. 10 is a block diagram 1000 which illustrates an optical storage array system such as may be employed in a data centre. The system comprises a plurality of drives 500 embodying the present invention.

In particular, the system 1000 comprises a host computer 1002 and an optical storage array (OSA) 1004. The OSA itself comprises a plurality of units, each of which includes a stack of physical media, i.e. discs, 1006. A selector 1008 is a mechanical device which is able to retrieve a specific desired disc from the stack 1006, and mounts it within the drive 500. All of the multi-disc-drive units operate under the control of an electronic/microprocessor controller 1010. In the arrangement shown, one particular multi-drive unit 1012 is employed to contain parity media, which may be used to detect and correct any errors which may arise in any of the main storage media, and therefore to ensure the integrity of the information stored in the OSA.

In order to maximise performance of the OSA 1004, access time for selection and transfer of discs to/from the drives is optimised. The controller 1010 can implement a control algorithm to synchronise the access times of individual drive units. The number of drive units can be increased depending on the desired data recording and readout throughput.

The OSA 1004 can be designed to optimise performance in terms of: high recording throughput; high storage capacity; high reading throughput; and data mirroring or duplicating.

Recording throughput gradually decreases with increasing recording file size. For improved efficiency, large file size data may be striped first. Striped data may be recorded across N identical drives, thus increasing throughput by a factor of N. Using drives capable of recording parallel information as shown in FIG. 7, the overall throughput of the OSA 1004 can be $T_{osa}=T \times p \times N$, where T is the transfer rate for single bit recording, p is the number of parallel bits to record and N is the number of drives connected in the OSA.

The OSA 1004 can also significantly increase the storage capacity. Total storage capacity is depends on the number of high density storage media discs. Overall storage capacity of the OSA 1004 is $C_{osa}=C \times N_m \times N$, where C is the storage capacity of a single disc, $N_m$ is the number of discs held within the stack 1006 of a single drive, and N is the number of drives.

In case of reading, the selector 1008 can first retrieve the addressed disc to read. For high throughput of data readout, retrieval time can be minimized. Once data has been read by a drive 500, it is transferred to a buffer within the controller 1010. The controller assembles striped data from the different physical addresses at multiple discs to restore the original file. Collecting data to the buffer prior to transfer to the host computer 1002 accelerates read throughput.

In case of data duplicating, instead of sending different striped data to all individual drives, data is sent to a set of selected drives also duplicated to other discs at different physical addresses. Since not all of the drive units can be used simultaneously to perform recording of a single file with duplication, capacity and data throughput decreases. Overall storage capacity of the OSA 1004 for disc mirroring is $C_{mirror}=C_{osa}/N_{mirror}$, where $C_{osa}$ is the storage capacity of the OSA 1004 without mirroring, and $N_{mirror}$ is the total number of duplicate discs employed. Throughput for disc mirroring is $T_{mirror}=T_{osa}/N_{mirror}$, where $T_{osa}$ is the overall throughput without mirroring.

In the above discussion, various methods, apparatus, systems and arrangements embodying the present invention have been described. It will be appreciated that these have been provided in order to facilitate a full understanding of the invention, and its practical implementation in various embodiments. It will be understood that these are not intended to indicate any specific limitations to the scope of the invention, and have been provided by way of example only. The scope of the invention is to be determined by reference to the claims appended hereto.

The invention claimed is:

1. A method of recording optically readable data, the method employing a provided recording medium which comprises an optically active material able to induce a change in properties of the medium in the presence of optical radiation having a first characteristic, and wherein the change in properties can be inhibited by optical radiation having a second characteristic, the method comprising: irradiating a region of the recording medium with a first beam of optical radiation having the first characteristic, the beam having a sufficient intensity within a central portion of the irradiated region and being of sufficient duration to cause an optically induced change in properties of the recording medium; and simultaneously irradiating the region of the recording medium with a second beam of optical radiation having the second characteristic, the second beam having a local intensity minimum within the central portion of the irradiated region, and a local intensity maximum in at least one portion of the irradiated region adjacent to the central portion which is sufficient to inhibit the optically induced change in properties of the recording medium.

2. The method of claim 1 wherein the first and second characteristics comprise different optical frequencies.

3. The method of claim 1 wherein the first beam of optical radiation has a Gaussian-shaped intensity distribution.

4. The method of claim 1 wherein the second beam has an annular intensity distribution.

5. The method of claim 1 wherein the second beam is formed to provide a three-dimensional hollow intensity distribution within a focal region.

6. The method of claim 1 wherein the first and second beams comprise a plurality of parallel beams.

7. The method of claim 6 comprising a step of applying pupil functions of the first and second beams to create multi-focal arrays in a focal plane.

8. The method of claim 1 comprising arranging and superposing selected polarisation states of the first and second beams to create a predetermined three-dimensional polarisation orientation of the fields within a focal region.

9. A method of optically reading data stored in a recording medium which comprises an optically active material in which a change in properties of the medium corresponding with recorded data has been induced in one or more regions, wherein the change in properties is detectable via a response of the medium to optical radiation having a first characteristic, and wherein the response of the medium can be inhibited by optical radiation having a second characteristic, the method comprising: irradiating a region of the recording medium with a first beam of optical radiation having the first characteristic, the first beam having sufficient intensity within a central portion of the irradiated region and being of sufficient duration to cause the response, but of insufficient intensity and duration to cause an optically induced change in properties of the recording medium; simultaneously irradiating the region of the recording medium with a second beam of optical radiation having the second characteristic, the second beam having a local intensity minimum within the central portion of the irradiated region, and a local intensity maximum in at least one portion of the irradiated region adjacent to the central portion which is sufficient to inhibit the response of the medium to the first beam of optical radiation; and detecting whether the medium exhibits the response to the first beam of optical radiation within the central portion of the irradiated region.

10. The method of claim 9 wherein the material response indicating changed properties is broadband optical radiation/phosphorescence, and the step of detecting comprises detecting whether the medium emits radiation in response to application of the first and second beams.

11. An optical data recording and reproduction apparatus comprising: a mounting configured to hold a recording medium which comprises an optically active material able to induce a change in properties of the medium, and to generate a material response indicative of the changed properties, in the presence of optical radiation having a first characteristic, and wherein the change in properties, and the response indicative of changed properties, can be inhibited by optical radiation having a second characteristic; a first optical source configured to control the emit radiation having the first characteristic; a first imaging system configured to controllably focus a first beam of optical radiation emitted from the first optical source onto a region of the recording medium, wherein the optical radiation has a maximum intensity within a central portion of the first beam; a second optical source configured to controllably emit radiation having the second characteristic; a second imaging system configured to controllably focus a second beam of optical radiation emitted from the second optical source onto the region of the recording medium, wherein the optical radiation has a local intensity minimum within a central portion of the second beam, and a local intensity maximum in at least one portion of the second beam adjacent to its central portion; and a controller configured to control at least the first optical source, the first imaging system, the second optical source, and the second imaging system, so as to simultaneously irradiate a selected region of a recording medium held in the mounting with optical radiation of a first selected intensity emitted from the first optical source, and with optical radiation of a second selected intensity emitted from the second optical source, to selectively record or read data to or from the recording medium.

12. The apparatus of claim 11 wherein the first imaging system comprises a modulator controllable to selectively control irradiation of the recording medium by the first beam.

13. The apparatus of claim 11 wherein the controller is configured to control intensity of at least the first optical beam in order to select between write and read operation of the recording and reproduction apparatus.

14. The apparatus of claim 11 wherein the first and second imaging systems are configured to generate a plurality of parallel optical beams.

15. The apparatus of claim 14 wherein the first and second imaging systems each comprise a spatial modulator positioned to enable selective formation the plurality of parallel optical beams.

16. The apparatus of claim 11 wherein the material response indicating changed properties is broadband optical radiation/phosphorescence, and the apparatus further comprises a photodetector configured to detect the presence of emitted radiation/phosphorescence during and/or following irradiation of the recording medium by the first and second beams.

17. An optical data storage system comprising: a plurality of optical data recording and reproduction apparatuses according to claim 11; a plurality of recording media associated with each optical data recording and reproduction apparatus, each recording medium being selectably loadable to the mounting of the associated optical data recording and reproduction apparatus; and a storage controller configured to receive requests for recording and retrieval of data within the storage system, to identify recording media within the system required for completion of the received requests, to cause the required recording media to be loaded to each associated optical data recording and reproduction apparatus, and to cause the associated optical data recording and reproduction apparatuses to complete recording and/or retrieval operations required for completion of the received requests.

18. A recording medium comprising a plurality of layers wherein at least one layer comprises an outer protective layer, and at least one other layer comprises an optically active material able to induce a change in properties of the medium, and to generate a material response indicative of the changed properties, in the presence of optical radiation having a first characteristic, and wherein the change in properties, and the response indicative of changed properties can be inhibited by optical radiation having a second characteristic even in the presence of optical radiation having the first characteristic.

19. The recording medium of claim 18 which comprises a disc.

20. The recording medium of claim 18 wherein the optically active material comprises a first excited state to which a transition may be induced by optical radiation having the first characteristic, and wherein the change in properties of the recording medium results from absorption of optical radiation having the first characteristic when in the first excited state.

21. The recording medium of claim 20 wherein the optically-active material has a property whereby the presence of optical radiation having the second characteristic induces a rapid transition from the first excited state, thereby inhibiting the change in properties of the medium.

22. The recording medium of claim 18 wherein the material response indicating changed properties is broadband optical radiation/phosphorescence resulting from decay of a first excited state to a ground state.

23. The recording medium of claim 18 wherein the thickness of the optically active material layer is sufficient to allow multiple internal layers of information storage.

24. The recording medium of claim 18 which comprises a tracking layer having radially disposed detectable tracking elements.

25. The recording medium of claim 24 wherein the tracking elements comprise one or more of: magnetic tracking elements; optical tracking elements; metallic tracking elements; and physical tracking elements.

26. A method of recording optically readable data, the method employing a provided recording medium which comprises a recording layer that comprises an optically active material able to induce a change in properties of the medium in the presence of optical radiation having a first characteristic and that stores data by the change in the properties of the medium, and wherein the change in properties can be inhibited by optical radiation having a second characteristic, the method comprising:
    irradiating a region of the recording layer with a first beam of optical radiation having the first characteristic, the beam having a sufficient intensity within a central portion of the irradiated region and being of sufficient duration to cause an optically induced change in properties of the recording medium; and
    simultaneously irradiating the region of the recording layer with a second beam of optical radiation having the second characteristic, the second beam having a local intensity minimum within the central portion of the irradiated region, and a local intensity maximum in at least one portion of the irradiated region adjacent to the central portion which is sufficient to inhibit the optically induced change in properties of the recording medium.

27. The method of claim 26 wherein the first and second characteristics comprise different optical frequencies.

28. The method of claim 26 wherein the second beam is formed to provide a three-dimensional hollow intensity distribution within a focal region.

29. The method of claim 26 wherein the first and second beams comprise a plurality of parallel beams.

30. The method of claim 29 comprising a step of applying pupil functions of the first and second beams to create multi-focal arrays in a focal plane.

31. The method of claim 26 comprising arranging and superposing selected polarisation states of the first and second beams to create a predetermined three-dimensional polarisation orientation of the fields within a focal region.

32. A method of optically reading data stored in a recording medium which comprises a recording layer that comprises an optically active material in which a change in properties of the medium corresponding with recorded data has been induced in one or more regions and that stores data by the change in the properties of the medium, wherein the change in properties is detectable via a response of the medium to optical radiation having a first characteristic, and wherein the response of the medium can be inhibited by optical radiation having a second characteristic, the method comprising:

irradiating a region of the recording layer with a first beam of optical radiation having the first characteristic, the first beam having sufficient intensity within a central portion of the irradiated region and being of sufficient duration to cause the response, but of insufficient intensity and duration to cause an optically induced change in properties of the recording medium;

simultaneously irradiating the region of the recording layer with a second beam of optical radiation having the second characteristic, the second beam having a local intensity minimum within the central portion of the irradiated region, and a local intensity maximum in at least one portion of the irradiated region adjacent to the central portion which is sufficient to inhibit the response of the medium to the first beam of optical radiation; and detecting whether the recording layer exhibits the response to the first beam of optical radiation within the central portion of the irradiated region.

33. The method of claim 32 wherein the material response indicating changed properties is broadband optical radiation/phosphorescence, and the step of detecting comprises detecting whether the medium emits radiation in response to application of the first and second beams.

34. An optical data recording and reproduction apparatus comprising:

a mounting configured to hold a recording medium which comprises a recording layer that comprises an optically active material able to induce a change in properties of the medium, and to generate a material response indicative of the changed properties, in the presence of optical radiation having a first characteristic, and wherein the change in properties, and the response indicative of changed properties, can be inhibited by optical radiation having a second characteristic;

a first optical source configured to control the emit radiation having the first characteristic;

a first imaging system configured to controllably focus a first beam of optical radiation emitted from the first optical source onto a region of the recording layer, wherein the optical radiation has a maximum intensity within a central portion of the first beam;

a second optical source configured to controllably emit radiation having the second characteristic;

a second imaging system configured to controllably focus a second beam of optical radiation emitted from the second optical source onto the region of the recording layer, wherein the optical radiation has a local intensity minimum within a central portion of the second beam, and a local intensity maximum in at least one portion of the second beam adjacent to its central portion; and a controller configured to control at least the first optical source, the first imaging system, the second optical source, and the second imaging system, so as to simultaneously irradiate a selected region of a recording layer held in the mounting with optical radiation of a first selected intensity emitted from the first optical source, and with optical radiation of a second selected intensity emitted from the second optical source, to selectively record or read data to or from the recording layer.

35. The apparatus of claim 34 wherein the first imaging system comprises a modulator controllable to selectively control irradiation of the recording layer by the first beam.

36. The apparatus of claim 34 wherein the controller is configured to control intensity of at least the first optical beam in order to select between write and read operation of the recording and reproduction apparatus.

37. The apparatus of claim 34 wherein the first and second imaging systems are configured to generate a plurality of parallel optical beams.

38. The apparatus of claim 37 wherein the first and second imaging systems each comprise a spatial modulator positioned to enable selective formation the plurality of parallel optical beams.

39. The apparatus of claim 34 wherein the material response indicating changed properties is broadband optical radiation/phosphorescence, and the apparatus further comprises a photodetector configured to detect the presence of emitted radiation/phosphorescence during and/or following irradiation of the recording layer by the first and second beams.

40. An optical data storage system comprising:

a plurality of optical data recording and reproduction apparatuses according to claim 36;

a plurality of recording media associated with each optical data recording and reproduction apparatus, each recording medium being selectably loadable to the mounting of the associated optical data recording and reproduction apparatus; and a storage controller configured to receive requests for recording and retrieval of data within the storage system, to identify recording media within the system required for completion of the received requests, to cause the required recording media to be loaded to each associated optical data recording and reproduction apparatus, and to cause the associated optical data recording and reproduction apparatuses to complete recording and/or retrieval operations required for completion of the received requests.

* * * * *